(12) United States Patent
Matousek et al.

(10) Patent No.: US 6,458,031 B1
(45) Date of Patent: Oct. 1, 2002

(54) CLEANING SYSTEM FOR A ROTARY COMBINE

(75) Inventors: Robert A. Matousek, Milan; Jonathan E. Ricketts, Viola, both of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/484,305

(22) Filed: Jan. 18, 2000

(51) Int. Cl.$^7$ ................................................ A01F 12/48
(52) U.S. Cl. ...................... 460/99; 460/69; 460/100; 460/101
(58) Field of Search ............................ 460/66, 59, 69, 460/79, 80, 97, 99, 100, 101, 119, 68

(56) References Cited

U.S. PATENT DOCUMENTS

| | | | |
|---|---|---|---|
| 3,857,400 A | * 12/1974 | De Coene | 460/66 |
| 4,250,897 A | 2/1981 | Glaser | |
| 4,412,549 A | * 11/1983 | Rowland-Hill | 460/100 |
| 5,045,025 A | * 9/1991 | Underwood | 460/66 |
| 5,387,154 A | * 2/1995 | Peters | 460/99 |
| 5,445,563 A | * 8/1995 | Stickler et al. | 460/69 |
| 5,525,108 A | 6/1996 | Rouse et al. | |

OTHER PUBLICATIONS

Case Corporation 2300 Series Combines Brochure.

* cited by examiner

Primary Examiner—Robert E. Pezzuto
Assistant Examiner—Meredith Petravick
(74) Attorney, Agent, or Firm—Brinks Hofer Gilson & Lione

(57) ABSTRACT

A rotary combine in which the cleaning system is located directly under the threshing and separating sections of the rotary threshing and separating assembly. The rotary threshing and separating assembly is separated from the cleaning system by a longitudinally extending, unobstructed air passage that extends from the front to the rear of the combine. Grain and material other than grain (MOG) are discharged from the threshing concave and separating grate portions of the rotor assembly at a relatively high velocity. The cleaning system includes a fan which produces a high velocity stream of air that flows upwardly through the shoe sieve and chaffer sieve and then along the unobstructed passage. Grain falls through the air stream to the chaffer sieve. The MOG, on the other hand, has a lower weight density, and is less aerodynamic than the grain so it is picked up by and carried along with the air stream. The MOG is discharged to the field out the rear of the rotary combine. Since the cleaning system has been relieved of the task of untangling the grain and MOG, the chaffer sieves can be opened wider and the efficiency of the cleaning system is improved. Another aspect of this invention relates to an improved method for processing the tailings.

18 Claims, 6 Drawing Sheets

CLEANING SYSTEM FOR A ROTARY COMBINE

FIELD OF THE INVENTION

This invention relates generally to rotary combines. It relates particularly to the cleaning system in a rotary combine, and the separation of grain and MOG (material other than grain) after it passes through the combine's threshing concave and separating grates.

BACKGROUND OF THE INVENTION

In most conventional rotary combines, the grain and MOG which pass through the threshing concave fall to a grain bed having screw conveyors for to conveying the grain and MOG rearwardly. At the rear of the grain bed, the grain and MOG together enter a cleaning system. The forward end of the cleaning system is near the fore-to-aft midpoint of the rotary threshing and separating assembly. Because the grain and MOG are collected together on the grain bed and conveyed by the screw conveyors, they become mixed and it is difficult to separate MOG from grain. As a result, either large quantities of MOG are deposited on the chaffer sieve of the cleaning system, along with the grain, or grain is blown out the rear of the combine enmeshed in a clump of MOG. This problem is exacerbated as the moisture content of the MOG increases.

In most rotary combines, a grain bed or its equivalent is provided below the separating portion of the rotary threshing and separating assembly. A conveying mechanism, such as screw conveyors, then conveys grain and MOG forward and deposits it either directly on the chaffer sieve or on the grain bed. In the latter case, screw conveyors in the grain bed then convey all of the grain and MOG rearwardly and deposit it on the chaffer sieve. In such machines, all of the grain and MOG which passes through the rotary threshing and separating assembly is deposited on the chaffer sieve of the cleaning system with grain and MOG intermixed. As a result, the cleaning system receives, and must process, almost all of the material which passes through the threshing concave and separating grates, untangling and separating MOG and grain as it does so. Consequently, in many crop conditions the cleaning system in such rotary combines is the limiting factor as to throughput.

In most conventional rotary combines, tailings are collected in a tailings auger which is located at the rear edge of the shoe sieve. The tailings, which may constitute up to 10% of the combine's throughput, are then elevated and recirculated into the rotary threshing and separating assembly. Since the tailings are being added to the material from the field, the assembly now must process 10% more material than it originally received from the field. On the next pass, the tailings are again recirculated into the assembly. The assembly then has to process 11% more material than it received from the field. As the combine continues to operate and the tailings continue to be recirculated, the total amount of material being sent to the rotary threshing and separating assembly increases geometrically, and eventually the load may stall the assembly.

SUMMARY OF THE INVENTION

It is an object of the present invention to provide an improved cleaning system for a rotary combine.

It is another object to provide a cleaning system which is effective to separate a high percentage of the MOG from grain and blow it out onto the field before it even reaches the chaffer sieve.

It is still another object to provide a cleaning system which effectively prevents overloading of the threshing and separating assembly with MOG.

It is a further object to provide a cleaning system which increases the throughput capacity of an axial-flow, rotary combine.

It is yet a further object to provide a cleaning system which recycles tailings onto the chaffer sieve in an optimal pattern regardless of whether the combine is operating on a side hill or on level ground.

It is yet another object to provide a simpler cleaning system, which has fewer moving parts and is less costly; a system which is more robust and operates well under all crop conditions and with all crops.

It is still another object to provide an improved grain cleaning method.

The foregoing and other objects are realized in accord with one aspect of the present invention by providing a rotary combine including a frame in which a longitudinally extending threshing and separating assembly is mounted. The threshing and separating assembly includes a threshing chamber having a threshing rotor rotatably mounted therein. The chamber and the rotor each include a threshing section and a separating section which cooperate to thresh and separate the crop. When the rotor is rotated relative to the chamber, grain and MOG are forced through the concave and grate of the chamber along substantially the entire length of the rotor.

Below the longitudinally extending threshing and separating assembly, a longitudinally extending cleaning system is supported on the combine frame. The cleaning system extends substantially the length of the threshing and separating assembly. It includes a horizontally elongated air passage which extends from front to rear below the threshing concave and separating grate and above the chaffer sieve of the longitudinally extending cleaning system.

The longitudinally extending threshing and separating assembly is inclined upwardly from the horizontal, front to rear, at an angle of about ten degrees. The sieve components of the longitudinally extending cleaning system below it are inclined upwardly, front to rear, at an angle of about five degrees. As a result, the aforementioned horizontally elongated air passage has a vertical dimension which is greater at the rear than at the front, i.e. the passage widens vertically as it proceeds rearwardly.

The longitudinally extending cleaning system of the invention includes a fan for generating a high velocity stream of air. The stream of air is directed upwardly and rearwardly through the vertically widening air passage. The stream of air is discharged from the combine through a MOG discharge port at the rear of the combine. The discharge port opening is large enough to permit the high velocity stream of air to leave the rotary combine unimpeded, carrying MOG with it for discharge to the field.

The air stream velocity generated by the fan is high enough that the MOG is carried with it and discharged through the MOG discharge port. However, the velocity is not so high that grain, which falls through the longitudinally extending threshing concave and separating grate, is carried along. Thus, the grain continues to fall through the stream of air to the underlying chaffer sieve.

According to one embodiment of the invention, the cleaning system of the invention incorporates a grain shaker pan located under the forward portion of the threshing concave. The chaffer sieve is immediately behind, and below, the grain shaker pan whereby an aperture having a vertical projection is defined between the rear edge of the shaker pan and the front edge of the chaffer sieve. A high velocity stream of air flowing through the aperture pre-cleans grain cascading over the rear edge of the grain shaker pan onto the chaffer sieve.

According to another embodiment of the invention, the grain shaker pan is omitted in favor of a downwardly sloped, stationery grain deflector below the extreme forward portion of the threshing concave zone. The chaffer and shoe sieves of the cleaning system extend forwardly closer to the front end of the threshing concave in this embodiment.

Regardless of the embodiment utilized, the air stream is generated by a fan in a housing which extends transversely across the front of the cleaning system. The housing includes a bottom panel which has a scroll shape. A top panel is arranged above it. Between them they define a fan outlet conduit. Because of the scroll shape, the conduit is long but compact so it can be received in available space within the combine.

According to the method of the invention, threshing and separating of grain from a crop is provided by the steps of feeding the crop into an axial flow, rotary threshing and separating assembly; moving the crop along a helical path through the rotary threshing and separating assembly in multiple passes over its threshing concave and separating grate; directing an uninterrupted, free flowing air stream below and along the length of the threshing and separating assembly so as to carry MOG along in the air stream for the length of the assembly; discharging the air stream along with the MOG that has been picked up and carried in the air stream; and collecting the grain which falls through the air stream along the length of the threshing and separating assembly.

DETAILED DESCRIPTION OF THE INVENTION

Figure 1:
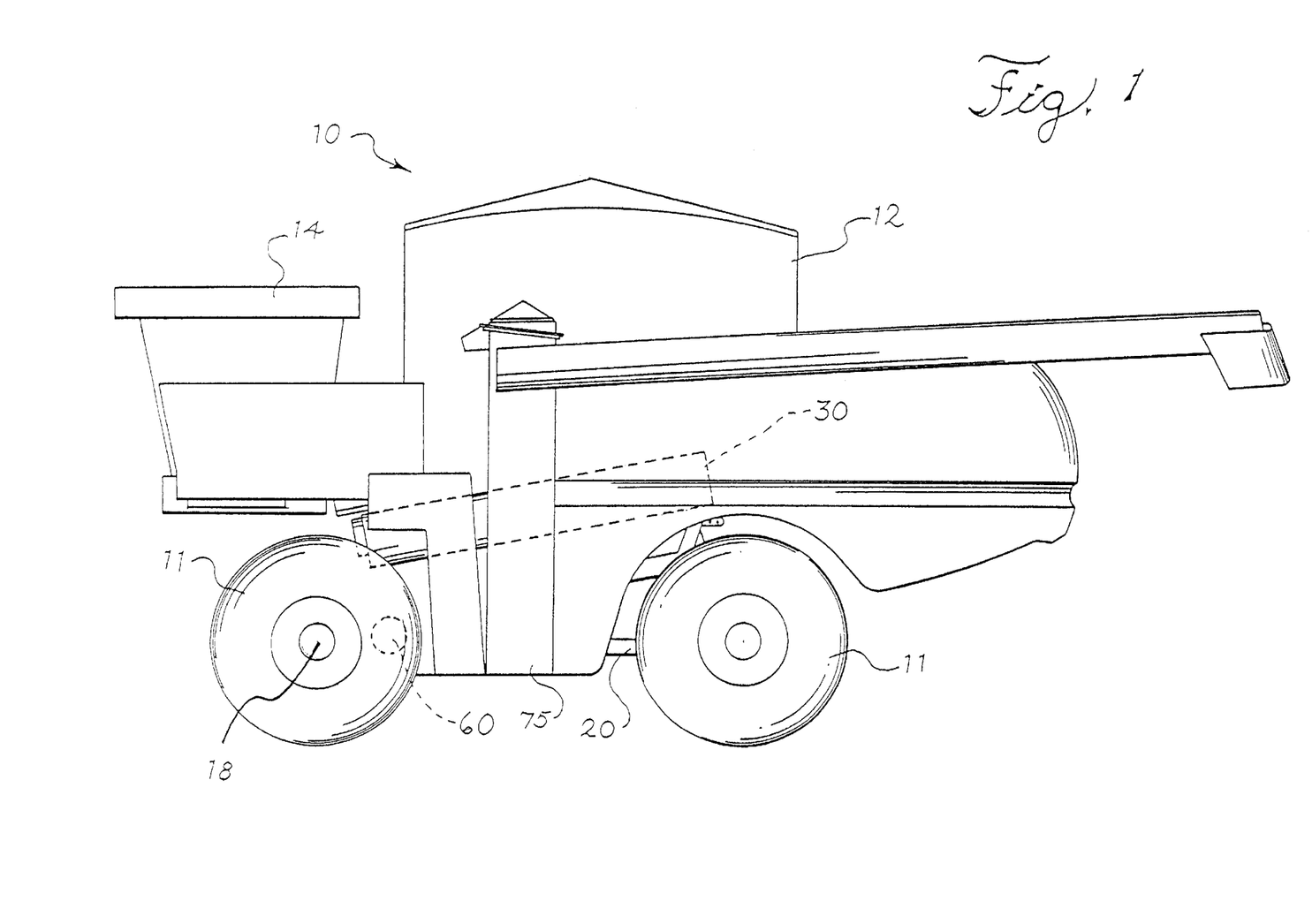
FIG. 1 is a left side view of a rotary combine containing a cleaning system embodying features of the present invention.
Figure 2:
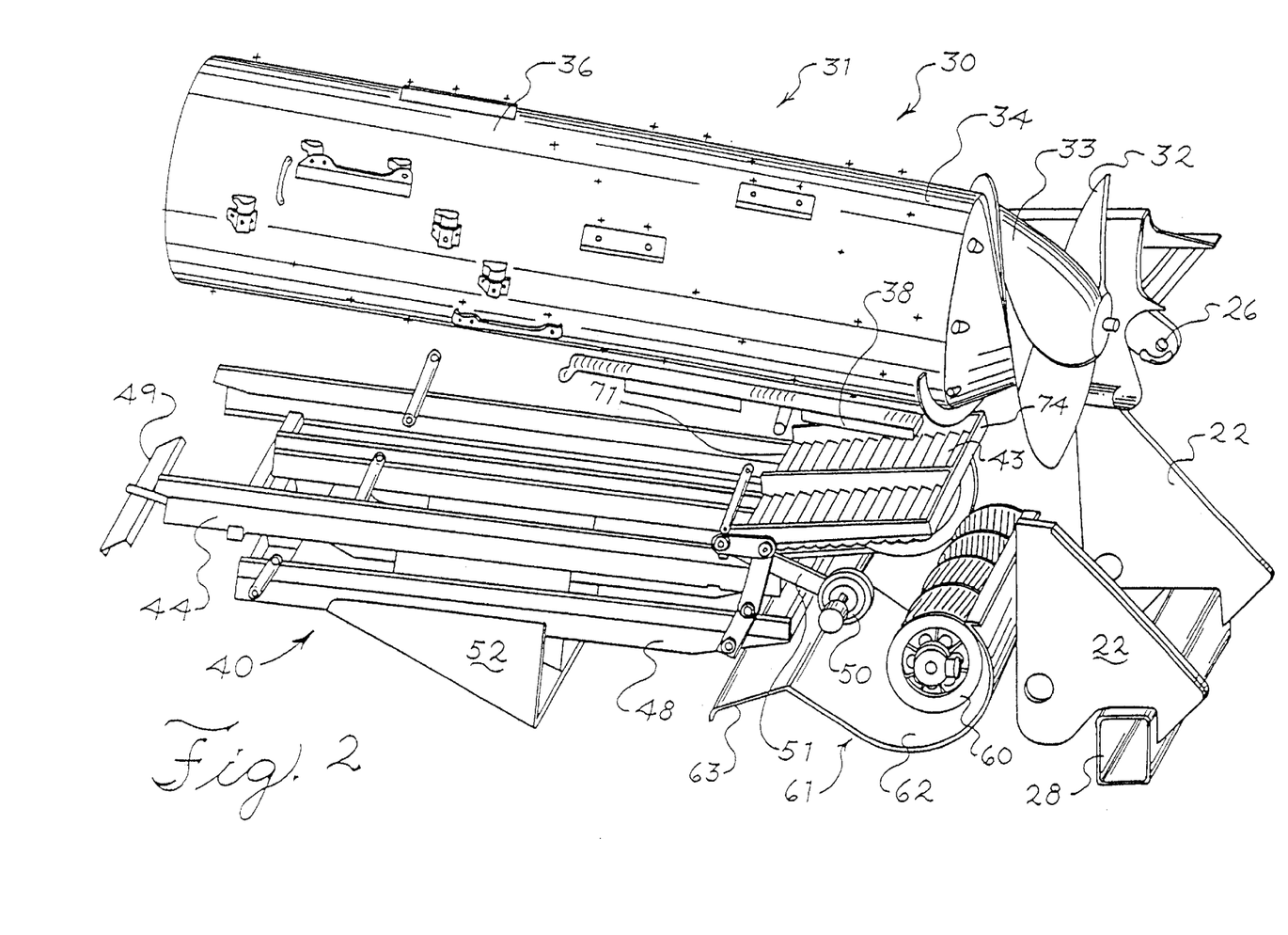
FIG. 2 is a right front perspective view of the threshing and separating assembly and the cleaning system in the rotary combine of FIG. 1, showing one embodiment of the cleaning system.
Figure 3:
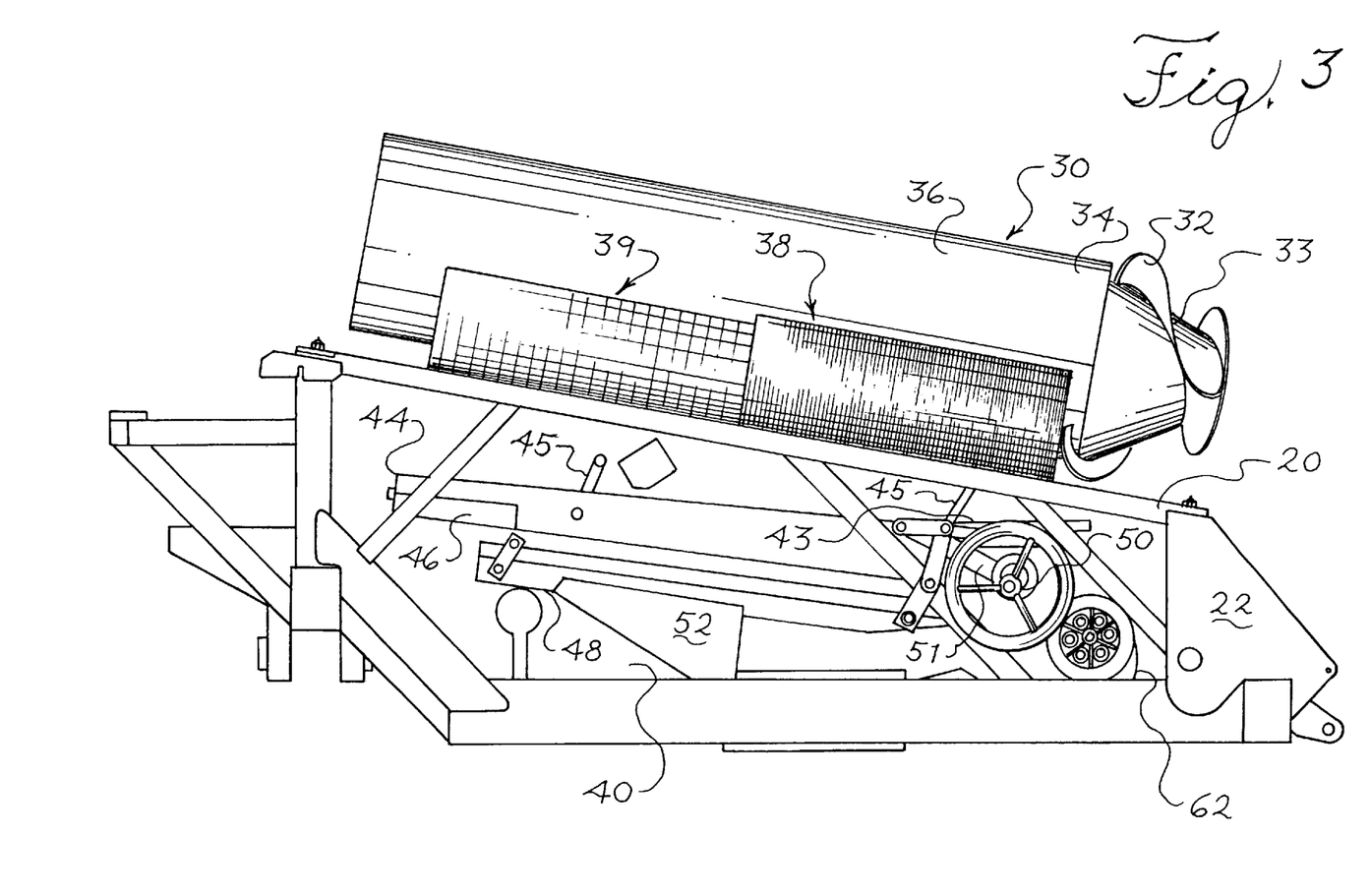
FIG. 3 is a right side view of the threshing and separating assembly and the cleaning system seen in FIG. 2.
Figure 4:
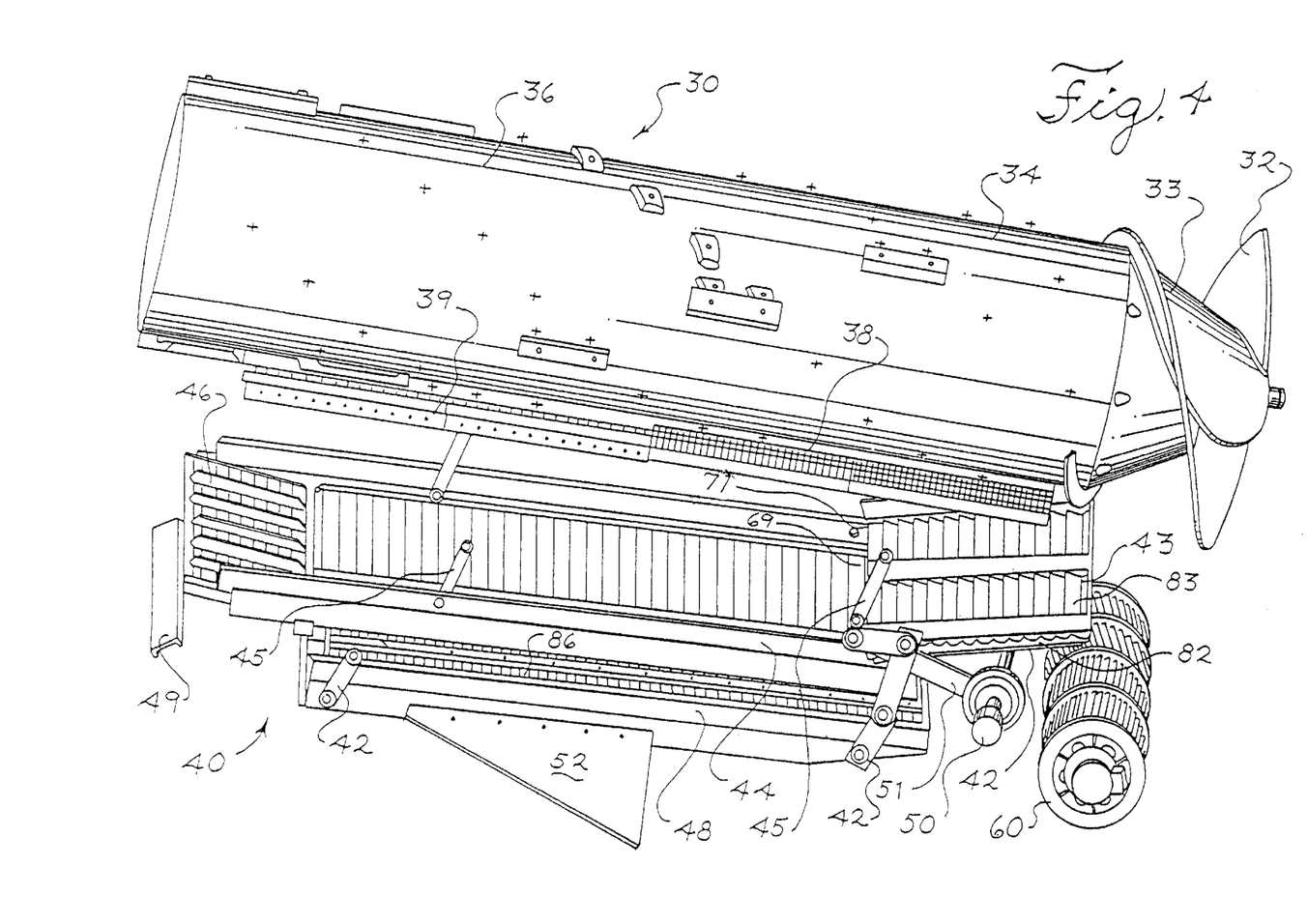
FIG. 4 is a right top perspective view of the threshing and separating assembly and the cleaning system seen in FIGS. 2 and 3.
Figure 5:
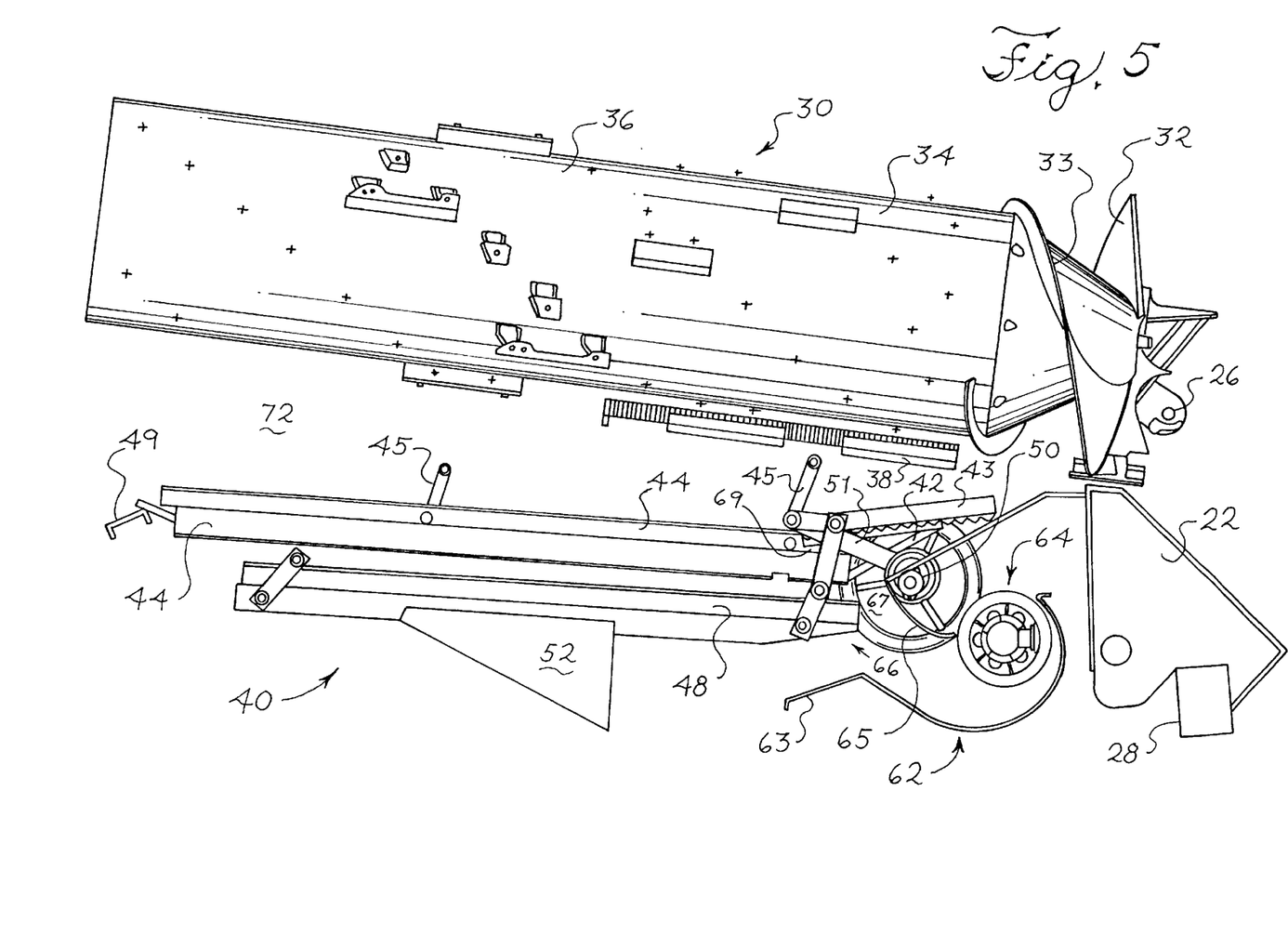
FIG. 5 is an enlarged right side view of the threshing and separating assembly and the cleaning system seen in FIGS. 2–4, with parts removed.

Referring now to the drawings, and particularly to FIG. 1, an axial-flow, rotary combine is shown generally at 10. The combine 10 includes a frame 20 supported by four wheels 11. A grain tank 12 and an operator's cab 14 are supported on the frame 20.

Mounted within the frame 20 is a rotary threshing and separating assembly 30. The assembly 30 is inclined upwardly, from front to rear, in the frame 20. Beneath the assembly 30, which comprises the threshing and separating system in the combine 10, is a cleaning system 40.

Referring now to FIGS. 2–5, the rotary threshing and separating assembly 30 and the cleaning system 40 are illustrated separately, along with related components of the combine 10. There it will be seen that the assembly 30 includes feed augers 32 in the form of impeller blades carried by a conical-shaped infeed section 33 on a rotor drum 31. The drum 31 is supported for rotation on the combine frame 20 and includes a front threshing section 34 and a rear separating section 36.

The drum 31 rotates within a cylindrical chamber (not shown). The chamber contains removable concaves 38 mounted on the combine frame 20 below the threshing section 34 of the rotor drum 31. The chamber also contains removable grates 39 mounted on the combine frame 20 below the separating section 36 of the rotor drum 31. The concaves 38 and the grates 39 are fixed in the cylinder during combine 10 operation but can be removed and replaced for servicing.

The infeed, threshing and separating sections 33, 34 and 36 of the rotor drum 31 are larger than corresponding sections found in conventional combines, but are otherwise of similar design. In this regard, the drum 31 in the assembly 30 illustrated is longer and has a greater diameter than any similar combines presently in use.

The cleaning system 40 shown in FIGS. 2–5 includes a cross-flow or squirrel-cage type fan 60 which extends across the front of the combine 10.

The fan 60 is sixty inches long and has a diameter of thirteen inches. It generates a radial stream of output air across the width of the cleaning system 40 at an output volume of about 25,000 CFM. Its capacity is about 20% larger than corresponding fans used in contemporary combines.

The fan 60, which is of a conventional, cross-flow design, is mounted in a housing 61 which includes a bottom panel 62 having a scroll shape and a top panel 65 which curves upwardly toward the drum 31. The panels 62 and 65 define an elongated outlet passage 67 between the fan 60 and the outlet mouth 66 of the passage. An air inlet 64 to the fan 60 is formed above the fan and the panels 62, 65.

The fan 60 is mounted on the combine frame 20 below the combine rotor infeed section 33 and to the rear of the combine front axle 18. A pair of triangular-shaped, vertically oriented frame members 22 supports the combine frame 20 on the front axle 18. Air is drawn into the fan inlet 64 between the vertical frame members 22.

The air that is drawn in through the air inlet 64 is discharged from the air outlet mouth 66 in a high velocity stream. A lip 63 on the scroll-shaped bottom panel 62 serves to guide a portion of the air stream from the fan 60 into the shoe which forms the bottom of a shoe sieve 48 in the cleaning system 40. This portion of the air stream flows upwardly through the openings in the shoe sieve 48, carrying any MOG on the sieve to the rear edge of the sieve where it is discharged into the tailings processing system (not shown).

The MOG which is on the shoe sieve 48 at this point has already been through the chaffer sieve 44 of the system 40 and contains intermingled grain. This MOG and any grain which has not been threshed free from the MOG will later be exposed to a second threshing as tailings. Meanwhile, grain which is loose on the shoe sieve 48 passes downwardly through openings in the shoe sieve. At the same time a portion of the air stream which passes up through the shoe sieve 48 continues upwardly through the openings in the chaffer sieve 44.

Meanwhile, the curved sheet metal panel 65 of the fan housing 61 guides another portion of the output air stream from the fan 60 upwardly under the trailing edge 71 of a shaker pan 43 in the cleaning system 40. This portion of the air stream functions as a pre-cleaner for grain and MOG which has already fallen from the threshing and separating assembly onto the pan 43 and is cascading off the pan 43 at its trailing edges 71.

Yet another portion of the air stream from the fan 60 flows between the upper surface of the shoe sieve 48 and the lower surface of the chaffer sieve 44. Some of this air stream portion flows upwardly through the openings in the chaffer sieve 44.

The shaker pan 43 employed in this embodiment of the invention is located below the front end of threshing and separating assembly 30. Its front edge 74 underlies the rearmost extremities of the feed augers 32 at the transition between the conical-shaped infeed section 33 and the threshing section 34 of the rotor drum 31. The shaker pan 43 extends rearwardly to its trailing edge 71, which underlies the midpoint of the concave 38.

The shaker pan 43 in the system 40 comprises a bottom deflector sheet 82 which is formed from an unperforated piece of sheet metal (and thus is impervious to the passage of air flow). The shaker pan 43 also includes a top sheet 83, which is formed of a solid piece of sheet metal formed into a corrugated, stair-step pattern.

The trailing edge 71 of the shaker pan 43 is disposed above the chaffer sieve 44. An aperture 69, having a vertical projection, is defined between the shaker pan edge 71 above and the chaffer sieve 44 below, through which the rest of the air stream from the fan 60 flows.

The shaker pan 43 and chaffer sieve 44 are suspended as a unit on links 45 pivotally connected to the combine frame 20 in a conventional manner. An eccentric drive 50 is provided for imparting reciprocating motion, through a drive member 51, to the unitary shaker pan 43, and chaffer sieve 44.

When the shaker pan 43 oscillates, grain and MOG on it are worked, or stepped, toward the trailing edge 71. This grain and MOG cascades over the edge 71, where it encounters the air stream flowing through the aperture 69. The grain falling from the shaker pan 43 falls directly to the chaffer sieve 44. However, MOG falling from the edge 71 of the shaker pan 43 is carried rearwardly by the air stream.

The chaffer sieve 44 has a chaffer sieve extension 46 at its rear end. MOG cascades off the chaffer sieve extension 46 and encounters a deflector 49 which deflects the MOG out the rear of the combine 10. Grain and MOG which pass through the chaffer sieve extension 46, rearward of the rear edge of the shoe sieve 48, fall to a tailings collection trough and tailings auger (not shown) in the aforementioned tailings system.

The chaffer sieve 44 includes a plurality of slats 85 which are pivotally mounted about respective transverse axes so that they can be pivoted to open and close the spaces between them like a venetian blind. The shoe sieve 48 is located below the chaffer sieve 44 and is shorter than the chaffer sieve 44. The shoe sieve 48 also includes a plurality of slats 86 which can be pivoted to open and close the spaces between them in the same manner. However, the shoe sieve 48 generally has narrower spaces than the chaffer sieve 44.

The front edge of the chaffer sieve 44 and the front edge of the shoe sieve 48 are substantially aligned at a position 14 inches to 18 inches rearwardly of the infeed section 33, but the chaffer sieve 44 extends considerably further to the rear than does the shoe sieve 48. The shoe sieve 48 is suspended from the chaffer sieve 44 on links 49. The shoe sieve 48 is connected to the eccentric drive 50 so as to be reciprocated as a unit with the chaffer sieve 44, although 180° out of phase with it.

A grain return pan 52 is secured to the rear portion of the shoe below the shoe sieve 48. The pan 52 catches clean grain which falls through the rear half of the shoe sieve 48. This clean grain slides forwardly down the return pan 52 to a clean grain handling system 75 (see FIG. 1) which conveys the clean grain up to the grain tank 12, together with grain which has already fallen through the front half of the shoe sieve 48.

As has been pointed out, the chaffer sieve 44 and shoe sieve 48 are suspended such that they are reciprocated horizontally. They are disposed substantially parallel to each other. However, according to the invention they are not parallel to the concaves 38 and grates 39. Rather, they diverge from the concaves 38 and grates 39 from front to rear so that an ever-widening (vertically) passage 72 is defined between the chaffer sieve 44 below and the concaves 38 and grates 39 above. This passage 72 is unobstructed from the shaker pan trailing edge 71 rearwardly.

Although portions of the operation of the cleaning system 40 have been described in the process of describing its structure and function, its entire operation will now be described in the context of combine 10 operation for purposes of clarity. In the operation of the rotary combine 10, crop is fed into the front end of the rotary threshing and separating assembly 30. The assembly 30 advances crop through the threshing and separating sections 34 and 36 along a helical path. The crop is processed during each loop of the helical path. Thus, the crop is exposed to multiple threshing and separating passes.

Along the entire length of the rotary threshing and separating assembly 30, the crop is threshed and grain is separated from the MOG. The grain and MOG are discharged through the threshing concaves 38 and the grates 39 in individual, discrete particles and not in a stream which is bound together in any way. In other words, the grain and MOG do not comprise a contiguous mixture as they emerge from the threshing concaves 38 and the separating grates 39. Furthermore, although both grain and MOG are normally discharged from the threshing concaves 38 and grates 39 at a high velocity, the exit velocity of the grain is greater than that of the MOG.

The grain is relatively heavy and has an aerodynamic shape. The MOG, on the other hand, is less dense and less aerodynamic than the grain, which results in it being deflected more when it encounters a transversely flowing air stream. As a result of their different densities and aerodynamic profiles, the grain and MOG are affected differently when encountering the air stream in the elongated passage 72. Because an air stream flows in an unobstructed path through this passage 72 from the front to the rear of the assembly 30, above the chaffer sieve 44 and below the concaves 38 and grates 39, a high percentage of the MOG is removed or separated without it ever reaching the chaffer sieve 44.

According to the invention, the unobstructed path in the passage 72 for this air stream starts at the beginning of the concave 38 and extends along the entire separating section of the grate 39. To generate this air stream, the fan 60 is located a considerable distance forward of the concave 38.

The air stream is directed so that air flows up through the shoe sieve 48 and the chaffer sieve 44. Air also flows through the space between the rear edge of the shaker pan 43 and the chaffer sieve 44. Above the chaffer sieve 44, an air stream flows parallel to the assembly 30 axis in the passage 72 between the assembly and the chaffer sieve.

This air stream in the passage 72 extends across the entire width of the concave 38 and grate 39 in the rotary combine 10. This air stream becomes deeper and deeper as it travels rearwardly, preferably from 1 foot deep at the front to 2 feet deep at the rear, whereby it always has sufficient depth that MOG which enters the top of the air stream near the front edge of the concave 38 can be carried by the air stream along the entire length of the assembly 30 before it falls vertically through the air stream. Further, the air stream is free to exit the combine 10 without resistance so that it can discharge the MOG that it is carrying to the field.

The short grain shaker pan 43 which has been provided in this embodiment bridges the short distance from the beginning of the threshing section 34 of the assembly 30 to the forward edge of the chaffer sieve 44. The grain shaker pan 43 is inclined downwardly toward the chaffer sieve 44 and has an upper surface formed into a series of descending steps. The shaker pan 43 moves with the chaffer sieve 44 so that grain and MOG which is received on it is walked off onto the front edge of the chaffer sieve 44.

The grain shaker pan 43 is designed to move grain and MOG which falls to its surface without intertwining the grain and MOG. This result is made possible by the strong air blast which the rotor assembly 30 normally directs outwardly through the concave 38. This air blast deflects off the grain shaker pan 43, carrying the lighter MOG with it as it is deflected toward the rear of the combine 10. This air blast joins with air flowing through the chaffer sieve 44 and under the shaker pan 43 through the aperture 69 to carry the MOG rearwardly where it is discharged to the field.

Figure 6:
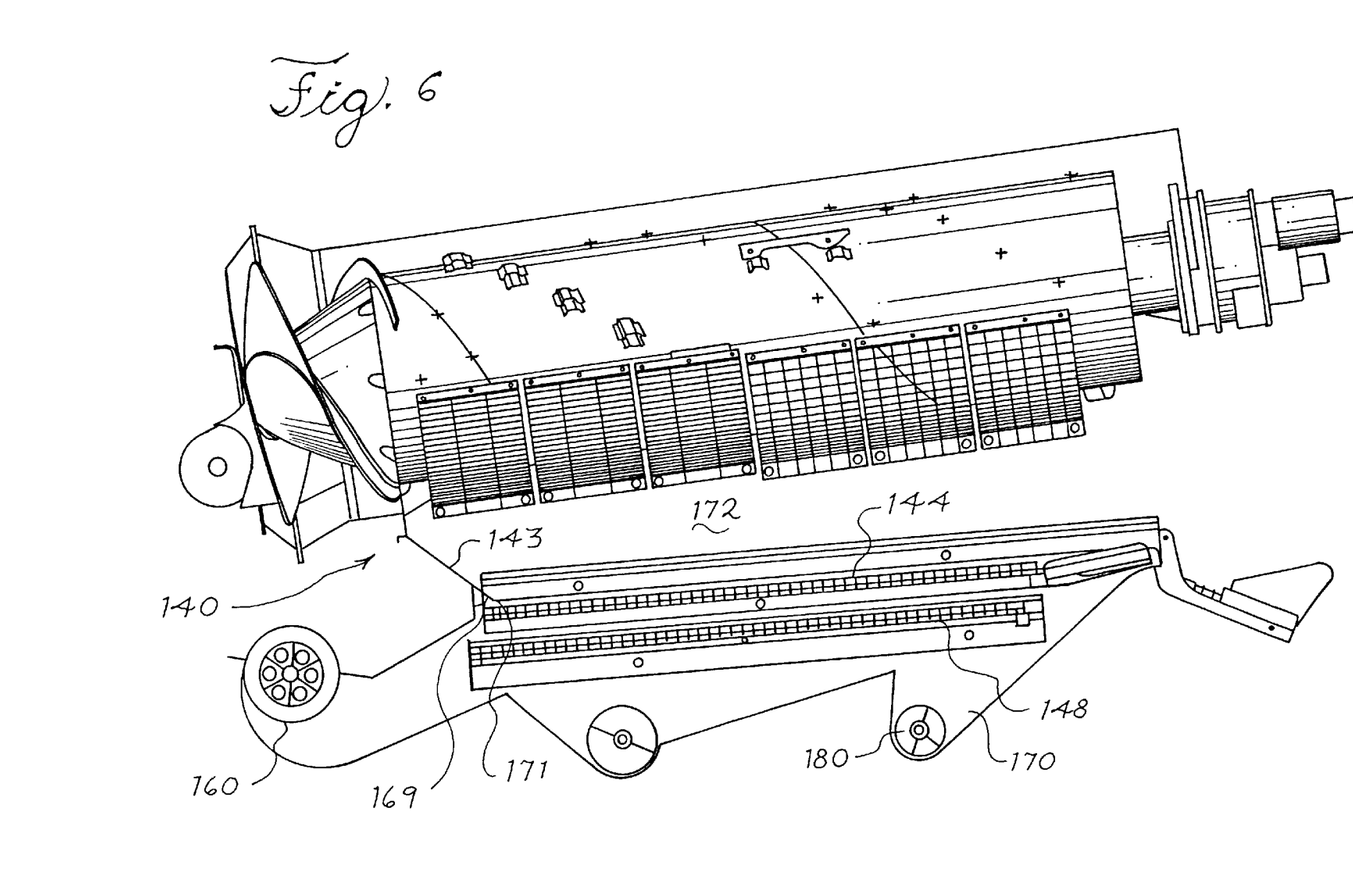
FIG. 6 is a left side view showing another embodiment of the cleaning system.

Referring now to FIG. 6, another embodiment of cleaning system is shown at 140. In the cleaning system 140, it will be seen that a shaker pan has been eliminated and replaced by a stationary guide plate 143. The chaffer sieve 144 and shoe sieve 148 extend forwardly under the rear edge 171 of the plate 143. An aperture 169 is defined between that edge 171 and the upper surface of the chaffer sieve 144 below.

In the cleaning system 140, the fan 160 directs a stream of air upwardly through and between the shoe sieve 148 and the chaffer sieve 144 in the same manner previously described in relation to the system 40. As illustrated, the fan 160 also directs a stream of air over the front end of the chaffer sieve 144 and into the passage 172 through this aperture 169. As with the system 40, the passage 172 is unobstructed and widens vertically from front to rear. It has been shown in tests that this arrangement will also be sufficient to produce highly efficient grain and MOG separation, i.e., an arrangement without a shaker pan.

The focus of the invention is on separating grain from MOG as they exit autonomously from the rotary threshing and separating assembly 30 and, thus, eliminating the opportunity for the grain and MOG to be mechanically mixed in a grain bed. As a result, the cleaning system 40 (or 140) is relieved of the task of screening the grain from the MOG, and the MOG is discharged to the field without being processed by the sieves. By sending less MOG to the chaffer sieve 44, the chaffer sieve can be opened wider. This provides cleaner grain and substantially increases the capacity of the cleaning system 40. Since the cleaning system has historically been a bottleneck, and other combine components have not been being utilized to capacity, the combine's capacity can be increased without a corresponding increase in the size of the cleaning system.

Another aspect of this invention resides in an improved method for processing the tailings. The rear portion of the chaffer sieve in contemporary combines is under-utilized. The present invention utilizes this capacity. Tailings are conveyed to one or both sides of the combine 10 by a tailings auger (not shown) in the tailings processing system. From there, the tailings are conveyed by fans to the space above the chaffer sieve 44 (or 144). In a combine where tailings are conveyed to both sides, the tailings from one side of the combine may be deposited on the opposite side of the chaffer sieve 44. This is particularly advantageous when the combine is not operating on level ground because a contemporary combine cleaning system is affected by the attitude of the combine. When a combine is operating on a hillside, the material being processed by the cleaning system tends to bunch or collect on the lower side of the combine. Thus, by depositing the tailings collected from the low side of the combine on the high side of the chaffer sieve 44 (or 144), the tailings are deposited on an under-utilized section of the chaffer sieve.

It is intended that the accompanying drawings and foregoing detailed description be considered as illustrative and not restrictive. The scope of the invention is intended to embrace all equivalents, alternatives, and /or modifications which fall within the spirit and scope of the invention.

What is claimed:

1. A rotary combine comprising:
   a) a frame;
   b) a rotary threshing and separating assembly mounted on said frame;
   c) said assembly including a threshing concave zone and a separating grate zone; and
   d) a cleaning system including a chaffer sieve longitudinally aligned with and positioned beneath said threshing and separating assembly, wherein said chaffer sieve extends forwardly under said threshing concave zone;
   e) said cleaning system also including a horizontally elongated passage between the chaffer sieve and the threshing and separating assembly having a vertical dimension which is less at the front end and greater at the rear end to allow a stream of air directed toward the rear end to carry away and discharge MOG;
   f) said cleaning system also including a device for creating said stream of air and directing it into said passage so that it flows rearwardly through said passage;
   g) said horizontally elongated passage being uninterrupted between said chaffer sieve and said separating grate zone whereby grain falling from said threshing and separating assembly in said separating grate zone falls directly onto said chaffer sieve after passing through said stream of air and said stream of air is unobstructed in its rearward flow.

2. The combine of claim 1 further characterized in that:
   a) said device comprises a fan positioned adjacent a front end of the frame to direct a high velocity stream of air rearwardly through said passage.

3. The combine of claim 1 wherein:
   a) said threshing and separating assembly is inclined upwardly from front to back at one angle to the horizontal.

4. The combine of claim 2 further characterized in that:
   a) said chaffer sieve is inclined upwardly from front to back at an angle of less than said one angle to the horizontal.

5. The combine of claim 4 further characterized in that:
a) said chaffer sieve is inclined upwardly from front to back at an angle above the horizontal which is about 5° less than the angle of the threshing and separating assembly.

6. The combine of claim 4 further characterized in that:
a) said device generates a stream of output air across the width of said cleaning system at an output volume of about 25,000 CFM.

7. The combine of claim 1 further characterized in that:
a) said cleaning system further comprises a shaker pan suspended below the front end of said threshing concave zone for horizontal reciprocating movement;
b) said device also directing a portion of said stream of air underneath said shaker pan.

8. The combine of claim 1 further characterized in that:
a) said cleaning system further comprises a stationary grain deflector suspended below the front end of said threshing concave zone;
b) said device also directing a portion of said stream of air underneath said grain deflector.

9. In a rotary combine including a frame with a rotary threshing and separating assembly mounted on said frame, said threshing and separating assembly including a leading thrashing concave zone and a trailing separating grate zone, the improvement in a cleaning system, comprising:
a) a cleaning system including a chaffer sieve and a shoe sieve longitudinally aligned with and positioned beneath said threshing and separating assembly;
b) said chaffer sieve extending forwardly under said threshing concave zone;
c) an inclined grain deflector member extending forwardly of said chaffer sieve and rearwardly of the front end of said threshing concave zone;
d) a horizontally elongated passage between the chaffer sieve and the threshing and separating assembly, said passage being uninterrupted from adjacent said deflector member to the rear end of said separating grate zone whereby grain falling from said threshing and separating assembly in said zones rearwardly of said grain deflector members fall directly onto said chaffer sieve; and
e) a fan for creating a stream of air and directing it into said passage adjacent said deflector member so that it flows rearwardly through said passage and is unobstructed in its rearward flow.

10. The improvement in a cleaning system of claim 9 further characterized in that:
a) said fan creates said stream of air with an output volume of about 25,000 CFM.

11. The improvement in a cleaning system of claim 9 further characterized in that:
a) said passage having a vertical dimension which is less at the front end and greater at the rear end.

12. A rotary combine comprising
a) a frame;
b) a rotary threshing and separating assembly mounted on said frame;
c) said assembly including a threshing concave zone containing threshing concaves and a separating grate zone containing separating grates, said rotary threshing and separating assembly being effective during operation to thresh and separate crop fed into it, whereby grain and MOG are forced radially out through said threshing concaves and separating grates; and
d) a cleaning system including a chaffer sieve longitudinally aligned with and positioned beneath said threshing and separating assembly, wherein said chaffer sieve extends forwardly under said threshing concave zone and defines a horizontally elongated passage between the chaffer sieve on the bottom and the threshing and separating assembly on the top, which passage is uninterrupted, whereby during operation of said assembly, grain falls directly from said concaves and grates onto said chaffer sieve;
e) said horizontally elongated passage defined by the chaffer sieve on the bottom and the threshing and separating assembly on the top having a vertical dimension which is less at the front end and greater at the rear end to allow a single stream of air directed toward the rear end to expand vertically and to carry away and discharge MOG which falls directly into said stream from said concaves and grates;
f) said cleaning system also including an air blower for creating said stream of air directing it into said passage.

13. The combine of claim 12 wherein:
a) said threshing and separating assembly is inclined upwardly from front to back at one angle to the horizontal.

14. The combine of 13 further characterized in that:
a) said chaffer sieve is inclined upwardly from front to back at an angle of less than said one angle to the horizontal.

15. The combine of claim 14 further characterized in that:
a) said chaffer sieve is inclined upwardly from front to back at an angle above the horizontal which is about 5° less than the angle of the threshing and separating assembly.

16. The combine of claim 12 further characterized in that:
a) said cleaning system further comprises a shaker pan suspended below the front end of said threshing concave zone for horizontal reciprocating movement;
b) said device also directing a portion of said stream of air underneath said shaker pan.

17. The combine of claim 12 further characterized in that:
a) said cleaning system further comprises a stationary grain deflector suspended below the front end of said threshing concave zone;
b) said device also directing a portion of said stream of air underneath said grain deflector.

18. A method of threshing and separating grain from a crop comprising the steps of:
a) feeding the crop into an axial flow rotary threshing and separating assembly;
b) exposing the crop to multiple passes over threshing concaves and separating grates of the axial flow rotary threshing while directing it along a spiral path;
c) directing an uninterrupted, vertically expanding air stream below and along the length of the axial flow rotary threshing and separating assembly;
d) picking up the MOG in the air stream along the length of the axial flow rotary threshing and separating assembly;
e) discharging the air stream along with the MOG that has been picked up and carried in the air stream; and
f) collecting the grain that falls through the air stream along the length of the axial flow rotary threshing and separating assembly.

* * * * *

UNITED STATES PATENT AND TRADEMARK OFFICE
CERTIFICATE OF CORRECTION

PATENT NO. : 6,458,031 B1
DATED : October 1, 2002
INVENTOR(S) : Robert A. Matousek et al.

It is certified that error appears in the above-identified patent and that said Letters Patent is hereby corrected as shown below:

<u>Column 10,</u>
Line 15, after "of air" insert -- and --.

Signed and Sealed this

Thirteenth Day of May, 2003

JAMES E. ROGAN
*Director of the United States Patent and Trademark Office*